United States Patent
Rezaiifar et al.

(10) Patent No.: US 10,643,375 B2
(45) Date of Patent: May 5, 2020

(54) DYNAMIC LIGHTING FOR OBJECTS IN IMAGES

(71) Applicant: QUALCOMM Incorporated, San Diego, CA (US)

(72) Inventors: Ramin Rezaiifar, Del Mar, CA (US); Antwan Gaggi, El Cajon, CA (US); Donna Roy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/107,868

(22) Filed: Aug. 21, 2018

(65) Prior Publication Data

US 2019/0266789 A1 Aug. 29, 2019

Related U.S. Application Data

(60) Provisional application No. 62/635,388, filed on Feb. 26, 2018.

(51) Int. Cl.
| | |
|---|---|
| *G06T 15/50* | (2011.01) |
| *G06T 7/194* | (2017.01) |
| *G06T 7/593* | (2017.01) |
| *G06T 7/586* | (2017.01) |
| *G06T 7/50* | (2017.01) |

(Continued)

(52) U.S. Cl.
CPC .......... *G06T 15/506* (2013.01); *G06T 7/194* (2017.01); *G06T 7/50* (2017.01); *G06T 7/586* (2017.01); *G06T 7/596* (2017.01); *G06T 15/80* (2013.01); *G06F 3/017* (2013.01); *G06F 3/04847* (2013.01); *G06F 3/167* (2013.01); *G06T 2207/10028* (2013.01); *G06T 2207/30201* (2013.01)

(58) Field of Classification Search
None
See application file for complete search history.

(56) References Cited

U.S. PATENT DOCUMENTS

| | | | |
|---|---|---|---|
| 2011/0254840 A1* | 10/2011 | Halstead | ................. G06T 15/04 345/421 |
| 2013/0129190 A1 | 5/2013 | Cohen et al. | |

(Continued)

OTHER PUBLICATIONS

Eisert P., "Immersive 3D video conferencing: challenges, concepts, and implementations", Visual Communications and Image Processing; Jul. 8, 2003-Jul. 11, 2003; Lugano,, Jul. 8, 2003, XP030080627, abstract, figures 7-9,13, sections 2.3, 2.4, 3.2, 11 pages.

(Continued)

*Primary Examiner* — Frank S Chen
(74) *Attorney, Agent, or Firm* — QUALCOMM Incorporated

(57) ABSTRACT

Techniques and systems are described herein for determining dynamic lighting for objects in images. Using such techniques and systems, a lighting condition of one or more captured images can be adjusted. Techniques and systems are also described herein for determining depth values for one or more objects in an image. In some cases, the depth values (and the lighting values) can be determined using only a single camera and a single image, in which case one or more depth sensors are not needed to produce the depth values.

30 Claims, 13 Drawing Sheets
(2 of 13 Drawing Sheet(s) Filed in Color)

(51) Int. Cl.
     *G06T 15/80*     (2011.01)
     *G06F 3/0484*     (2013.01)
     *G06F 3/01*     (2006.01)
     *G06F 3/16*     (2006.01)

(56) References Cited

U.S. PATENT DOCUMENTS

2016/0049001 A1* 2/2016 Anderson ............... G06T 17/05
     345/419
2019/0035149 A1* 1/2019 Chen ....................... G06T 15/04

OTHER PUBLICATIONS

International Search Report and Written Opinion—PCT/US2019/015017—ISA/EPO—dated Jun. 7, 2019.
Laina I., et al., "Deeper Depth Prediction with Fully Convolutional Residual Networks", 2016 Fourth International Conference on 3D Vision (3DV), IEEE, Oct. 25, 2016, XP033027630, DOI: 10.1109/3DV.2016.32 [retrieved on Dec. 15, 2016], pp. 239-248.

* cited by examiner

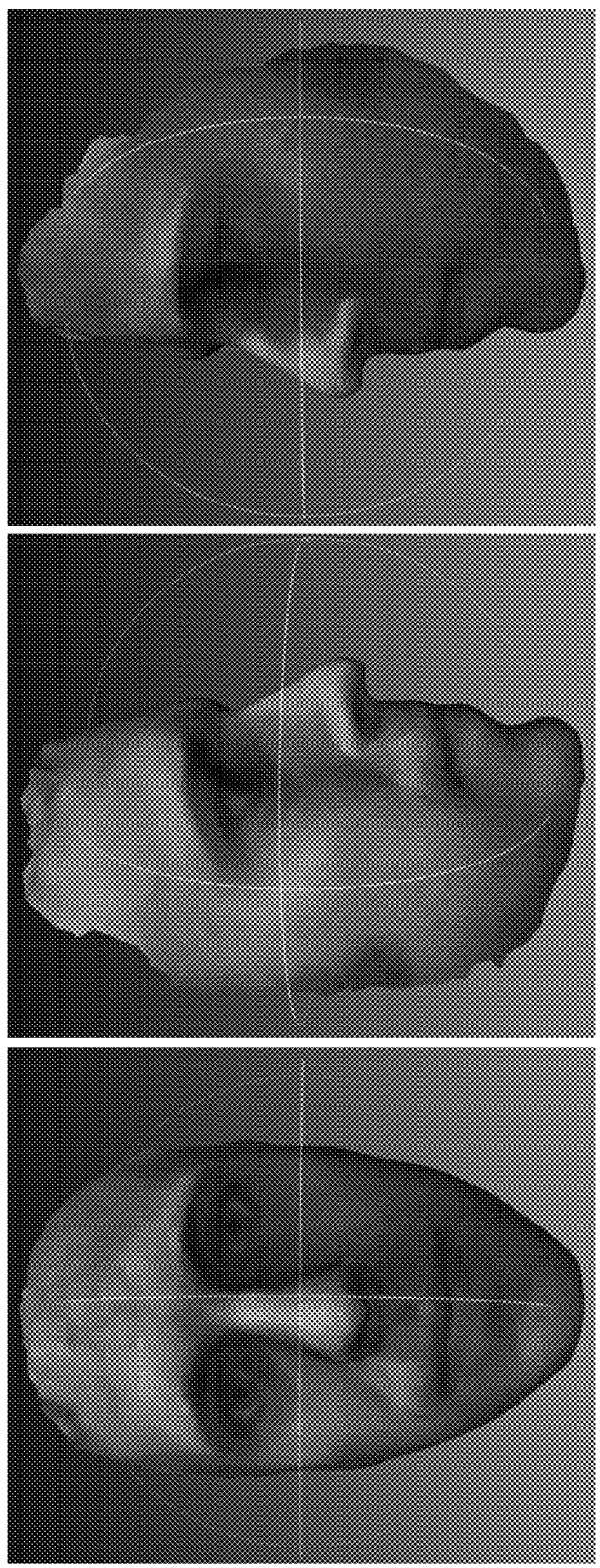

DYNAMIC LIGHTING FOR OBJECTS IN IMAGES

CROSS-REFERENCE TO RELATED APPLICATIONS

This application claims the benefit of U.S. Provisional Application No. 62/635,388, filed Feb. 26, 2018, which is hereby incorporated by reference, in its entirety and for all purposes.

FIELD

The present disclosure generally relates to techniques and systems for determining dynamic lighting for objects in images.

BACKGROUND

Images of objects can be captured by devices, such as a camera or mobile device having one or more cameras. In such images, the lighting is frozen at the time of capture of the image, and as a result, shadows and highlights created by the existing lighting at the time of capture are frozen. The lighting characteristics of such images typically cannot be changed to modify the appearance of the images.

BRIEF SUMMARY

Techniques and systems are described herein for determining dynamic lighting for objects in images. Techniques and systems are also described herein for determining depth values for one or more objects in an image. In some cases, the depth values (and the lighting values) can be determined using only a single camera and a single image, in which case one or more depth sensors are not needed to produce the depth values. The determined depth values can be used to determine the dynamic lighting.

Dynamic lighting can be determined for an object by performing a segmentation stage, a depth modeling stage, and a light stage. The segmentation stage can segment the object (the foreground) from the remaining portion of the image (the background). In some examples, the segmentation stage can generate a segmentation mask around the object. The depth modeling stage can obtain a three-dimensional model and can warp the model so that the model is customized to fit to the object. Depth values from a camera to the object can be determined for points of the three-dimensional model, and can be used to generate the customized (or object-specific) depth map. In some cases, the depth model can be selected for the object from a set of stored depth models. The warping can be performed using features extracted from the object. The depth modeling stage can be performed using a single camera (and thus without using multiple cameras) and without performing any active sensing using depth sensors. Once the depth model is fit to the object, the light stage can simulate the effects of a dynamic light shining on the object. For example, properties of the light shining on the object in the image can be controlled and modified. The controllable properties can include the intensity, position, and direction of the light.

According to at least one example, a method for adjusting a lighting condition in one or more captured images is provided. The method includes obtaining a segmentation mask including foreground pixels representing an object in an image. The method further includes generating, using the segmentation mask, an object-specific depth map associated with the object. The object-specific depth map includes depth values for points of the object in the image. The method further includes determining, based on user input associated with one or more lighting characteristics for the image, lighting values for the points of the object in the image. The method further includes applying the lighting values to the points of the object in the image.

In another example, an apparatus for adjusting a lighting condition in one or more captured images is provided that includes a memory configured to store one or more images and a processor. The processor is configured to and can obtain a segmentation mask including foreground pixels representing an object in an image. The processor is further configured to and can generate, using the segmentation mask, an object-specific depth map associated with the object. The object-specific depth map includes depth values for points of the object in the image. The processor is further configured to and can determine, based on user input associated with one or more lighting characteristics for the image, lighting values for the points of the object in the image. The processor is further configured to and can apply the lighting values to the points of the object in the image.

In another example of adjusting a lighting condition in one or more captured images, a non-transitory computer-readable medium is provided that has stored thereon instructions that, when executed by one or more processors, cause the one or more processor to: obtain a segmentation mask including foreground pixels representing an object in an image; generate, using the segmentation mask, an object-specific depth map associated with the object, the object-specific depth map including depth values for points of the object in the image; determine, based on user input associated with one or more lighting characteristics for the image, lighting values for the points of the object in the image; and apply the lighting values to the points of the object in the image.

In another example, an apparatus for adjusting a lighting condition in one or more captured images is provided. The apparatus includes means for obtaining a segmentation mask including foreground pixels representing an object in an image. The apparatus further includes means for generating, using the segmentation mask, an object-specific depth map associated with the object. The object-specific depth map includes depth values for points of the object in the image. The apparatus further includes means for determining, based on user input associated with one or more lighting characteristics for the image, lighting values for the points of the object in the image. The apparatus further includes means for applying the lighting values to the points of the object in the image.

In some aspects, the object-specific depth map is generated by fitting points of a three-dimensional model to points of the object in the image. In some aspects, generating the object-specific depth map includes: obtaining coordinates of object feature points of the object in the image; determining coordinates of corresponding points of the three-dimensional model that correspond to the object feature points of the object; modifying the coordinates of the corresponding points of the three-dimensional model to match the coordinates of the object feature points of the object; modifying coordinates of remaining points of the three-dimensional model to match coordinates of remaining points of the object in the image by interpolating between the object feature points; and assigning depth values to the points of the object in the image.

In some aspects, the methods, apparatuses, and computer-readable medium described above for adjusting a lighting condition in one or more images further comprise selecting the three-dimensional model from a plurality of models based on the object in the image. In some cases, the plurality of models are stored locally on a computing device. In some cases, the plurality of models are stored remotely on one or more servers.

In some aspects, the methods, apparatuses, and computer-readable medium described above for adjusting a lighting condition in one or more captured images further comprise: receiving the image of the object; and generating the segmentation mask by segmenting the image into the foreground pixels of the object and background pixels.

In some aspects, the methods, apparatuses, and computer-readable medium described above for adjusting a lighting condition in one or more images further comprise: generating an object-specific model for the object, wherein the object-specific model is generated by fitting points of a three-dimensional model to points of the object in the image; and storing the object-specific model. In some examples, the methods, apparatuses, and computer-readable medium described above for generating dynamic lighting for one or more objects in one or more images further comprise: receiving an additional image of the object; obtaining the object-specific model of the object; and determining lighting values for points of the object in the additional image using the object specific model.

In some aspects, generating the object-specific depth map includes using the segmentation mask to determine which pixels from the image include the foreground pixels of the object.

In some aspects, the one or more lighting characteristics include one or more of an intensity of a light source, a color of light from the light source, a direction of the light source relative to the object in the image, a position of the light source relative to the object in the image, a diffuseness of the light source, and a roughness of a surface of the object.

In some aspects, determining the lighting values for the points of the object in the image includes: determining a normal map using the object-specific depth map, the normal map including vectors perpendicular to a surface of the object; determining, based on the user input, one or more characteristics of a light source, the one or more characteristics of the light source including one or more of an intensity of the light source, a color of light from the light source, a direction of the light source relative to the object in the image, a position of the light source relative to the object in the image, and a diffuseness of the light source; determining a reflectivity of each point of the object in the image based on a roughness of the object; and determining the lighting values for the points of the object in the image based on the normal map, the one or more characteristics of the light source, and the reflectivity of each point of the object.

In some aspects, the object includes a face of a person. In some cases, the object feature points of the object in the image include facial landmarks on the face. In some aspects, the object can include any other suitable object.

In some aspects, the image of the object is captured using a single camera. In some cases, the depth values are determined without using an additional camera other than the single camera and without using an additional image other than the image of the object. In some cases, the depth values are determined without using any depth sensor. In some cases, the lighting values are determined without using pre-determined lighting values determined prior to receiving the image.

In some aspects, the methods, apparatuses, and computer-readable medium described above for adjusting a lighting condition in one or more images further comprise: receiving, from a graphical user interface, the user input associated with the one or more lighting characteristics for the image; and displaying the image of the object with the applied lighting values. In some cases, the user input is received in response to an adjustment of a slider graphical element of the graphical interface. In some cases, the user input is received in response to selection of an icon graphical element of the graphical interface. In some cases, the user input is received in response to entry of text in a text entry graphical element of the graphical interface. In some cases, the user input is received in response to an audio command from the user. In some cases, the user input is received in response to a gesture command from the user.

In some aspects, the methods, apparatuses, and computer-readable medium described above for adjusting a lighting condition in one or more images further comprise: receiving additional user input requesting a change in lighting; determining, based on the additional user input, updated lighting values for the points of the object in the image; and applying the updated lighting values to the points of the object in the image.

According to another example, a method of generating one or more object-specific depth maps for one or more objects in one or more images is provided. The method includes capturing, using a single camera, an image of an object. The method further includes generating a segmentation mask from the image. The segmentation mask includes foreground pixels representing the object in the image. The method further includes generating, using the segmentation mask, an object-specific depth map associated with the object. The object-specific depth map includes depth values for points of the object-specific depth map.

In another example, an apparatus for generating one or more object-specific depth maps for one or more objects in one or more images is provided that includes a memory configured to store one or more images and a processor. The processor is configured to and can capture, using a single camera, an image of an object. The processor is further configured to and can generate a segmentation mask from the image. The segmentation mask includes foreground pixels representing the object in the image. The processor is further configured to and can generate, using the segmentation mask, an object-specific depth map associated with the object. The object-specific depth map includes depth values for points of the object-specific depth map.

In another example of generating one or more object-specific depth maps for one or more objects in one or more images, a non-transitory computer-readable medium is provided that has stored thereon instructions that, when executed by one or more processors, cause the one or more processor to: capture, using a single camera, an image of an object; generate a segmentation mask from the image, the segmentation mask including foreground pixels representing the object in the image; and generate, using the segmentation mask, an object-specific depth map associated with the object, the object-specific depth map including depth values for points of the object-specific depth map.

In another example, an apparatus for generating one or more object-specific depth maps for one or more objects in one or more images is provided. The apparatus includes means for capturing, using a single camera, an image of an object. The apparatus further includes means for generating a segmentation mask from the image. The segmentation mask includes foreground pixels representing the object in the image. The apparatus further includes means for generating, using the segmentation mask, an object-specific depth map associated with the object. The object-specific depth map includes depth values for points of the object-specific depth map.

In some aspects, the segmentation mask is generated by segmenting the image into the foreground pixels of the object and background pixels.

In some aspects, the object-specific depth map is generated by fitting points of a three-dimensional model to the points of the object in the image.

In some aspects, generating the object-specific model includes: obtaining coordinates of object feature points of the object in the image; determining coordinates of corresponding points of the three-dimensional model that correspond to the object feature points of the object; modifying the coordinates of the corresponding points of the three-dimensional model to match the coordinates of the object feature points of the object; modifying coordinates of remaining points of the three-dimensional model to match coordinates of remaining points of the object in the image by interpolating between the object feature points; and assigning depth values to the points of the object in the image.

In some aspects, the segmentation mask is used to determine foreground pixels in the image that correspond to the object.

In some aspects, the object includes a face of a person. In some cases, the object feature points of the object in the image include facial landmarks on the face. In some aspects, the object can include any other suitable object.

In some aspects, the depth values are determined without using an additional camera other than the single camera and without using an additional image other than the image of the object. In some aspects, the depth values are determined without using any depth sensor.

In some aspects, the methods, apparatuses, and computer-readable medium described above for generating one or more object-specific depth maps for one or more objects in one or more images further comprise: determining, based on user input associated with one or more lighting characteristics for the image, lighting values for the points of the object in the image; and applying the lighting values to the points of the object in the image.

In some aspects, the one or more lighting characteristics include one or more of an intensity of a light source, a color of light from the light source, a direction of the light source relative to the object in the image, a position of the light source relative to the object in the image, a diffuseness of the light source, and a roughness of a surface of the object.

In some aspects, determining the lighting values for the points of the object in the image includes: determining a normal map using the object-specific depth map, the normal map including vectors perpendicular to a surface of the object; determining, based on the user input, one or more characteristics of a light source, the one or more characteristics of the light source including one or more of an intensity of the light source, a color of light from the light source, a direction of the light source relative to the object in the image, a position of the light source relative to the object in the image, and a diffuseness of the light source; determining a reflectivity of each point of the object in the image based on a roughness of the object; and determining the lighting values for the points of the object in the image based on the normal map, the one or more characteristics of the light source, and the reflectivity of each point of the object.

According to another example, a method of generating a graphical interface for adjusting dynamic lighting for one or more objects in one or more images is provided. The method includes generating a graphical interface on a computing device, and obtaining an image of an object. The image is captured by a single camera. The method further includes receiving user input corresponding to one or more lighting characteristics for the image. The method further includes determining, based on the user input corresponding to the one or more lighting characteristics, lighting values for the points of the object in the image. The method further includes applying the lighting values to the points of the object in the image, and displaying the image of the object with the applied lighting values.

In another example, an apparatus for generating a graphical interface for adjusting dynamic lighting for one or more objects in one or more images is provided that includes a memory configured to store one or more images and a processor. The processor is configured to and can generate a graphical interface on a computing device. The processor is further configured to and can obtain an image of an object. The image is captured by a single camera. The processor is further configured to and can receive user input corresponding to one or more lighting characteristics for the image. The processor is further configured to and can determine, based on the user input corresponding to the one or more lighting characteristics, lighting values for the points of the object in the image. The processor is further configured to and can apply the lighting values to the points of the object in the image. The processor is further configured to and can display the image of the object with the applied lighting values.

In another example of generating a graphical interface for adjusting dynamic lighting for one or more objects in one or more images, a non-transitory computer-readable medium is provided that has stored thereon instructions that, when executed by one or more processors, cause the one or more processor to: generate a graphical interface on a computing device; obtain an image of an object, wherein the image is captured by a single camera; receive user input corresponding to one or more lighting characteristics for the image; determine, based on the user input corresponding to the one or more lighting characteristics, lighting values for the points of the object in the image; apply the lighting values to the points of the object in the image; and display the image of the object with the applied lighting values.

In another example, an apparatus for generating a graphical interface for adjusting dynamic lighting for one or more objects in one or more images is provided. The apparatus includes means for generating a graphical interface on a computing device, and means for obtaining an image of an object. The image is captured by a single camera. The apparatus further includes means for receiving user input corresponding to one or more lighting characteristics for the image. The apparatus further includes means for determining, based on the user input corresponding to the one or more lighting characteristics, lighting values for the points of the object in the image. The apparatus further includes means for applying the lighting values to the points of the object in the image, and means for displaying the image of the object with the applied lighting values.

In some aspects, the one or more lighting characteristics include one or more of an intensity of a light source, a color of light from the light source, a direction of the light source relative to the object in the image, a position of the light source relative to the object in the image, a diffuseness of the light source, and a roughness of a surface of the object.

In some aspects, the methods, apparatuses, and computer-readable medium described above for generating a graphical interface for adjusting dynamic lighting for one or more objects in one or more images further comprise: receiving additional user input requesting a change in at least one of the one or more lighting characteristics; determining, based on the additional user input, updated lighting values for the points of the object in the image; and applying the updated lighting values to the points of the object in the image.

In some aspects, the change in the at least one of the one or more lighting characteristics requested by the additional user input includes one or more of a change in intensity of a light source, a change in a color of light from the light source, a change in a direction of the light source relative to the object in the image, a change in position of the light source relative to the object in the image, and a change in a diffuseness of the light source.

In some aspects, the additional user input is received in response to an adjustment of a slider graphical element of the graphical interface. In some aspects, the additional user input is received in response to selection of an icon graphical element of the graphical interface. In some aspects, the additional user input is received in response to entry of text in a text entry graphical element of the graphical interface. In some aspects, the additional user input is received in response to an audio command from the user. In some aspects, the additional user input is received in response to a gesture command from the user.

In some aspects, the object includes a face of a person. In some aspects, the object can include any other suitable object.

In some examples, any of the apparatuses described above can include a display for displaying one or more images. For example, the display can include one or more images with determined lighting values. In some examples, any of the apparatuses described above can include a mobile device with a camera for capturing the one or more images.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

The patent or application file contains at least one drawing executed in color. Copies of this patent or patent application with color drawing(s) will be provided by the Office by request and payment of the necessary fee. Illustrative embodiments of the present application are described in detail below with reference to the following drawing figures:

FIG. 4A-FIG. 4C are diagrams illustrating different views of a three-dimensional point cloud with texture, in accordance with some examples;

FIG. 4B is an example of a video frame showing detected objects within a scene being tracked, in accordance with some examples;

DETAILED DESCRIPTION

Figure 1:
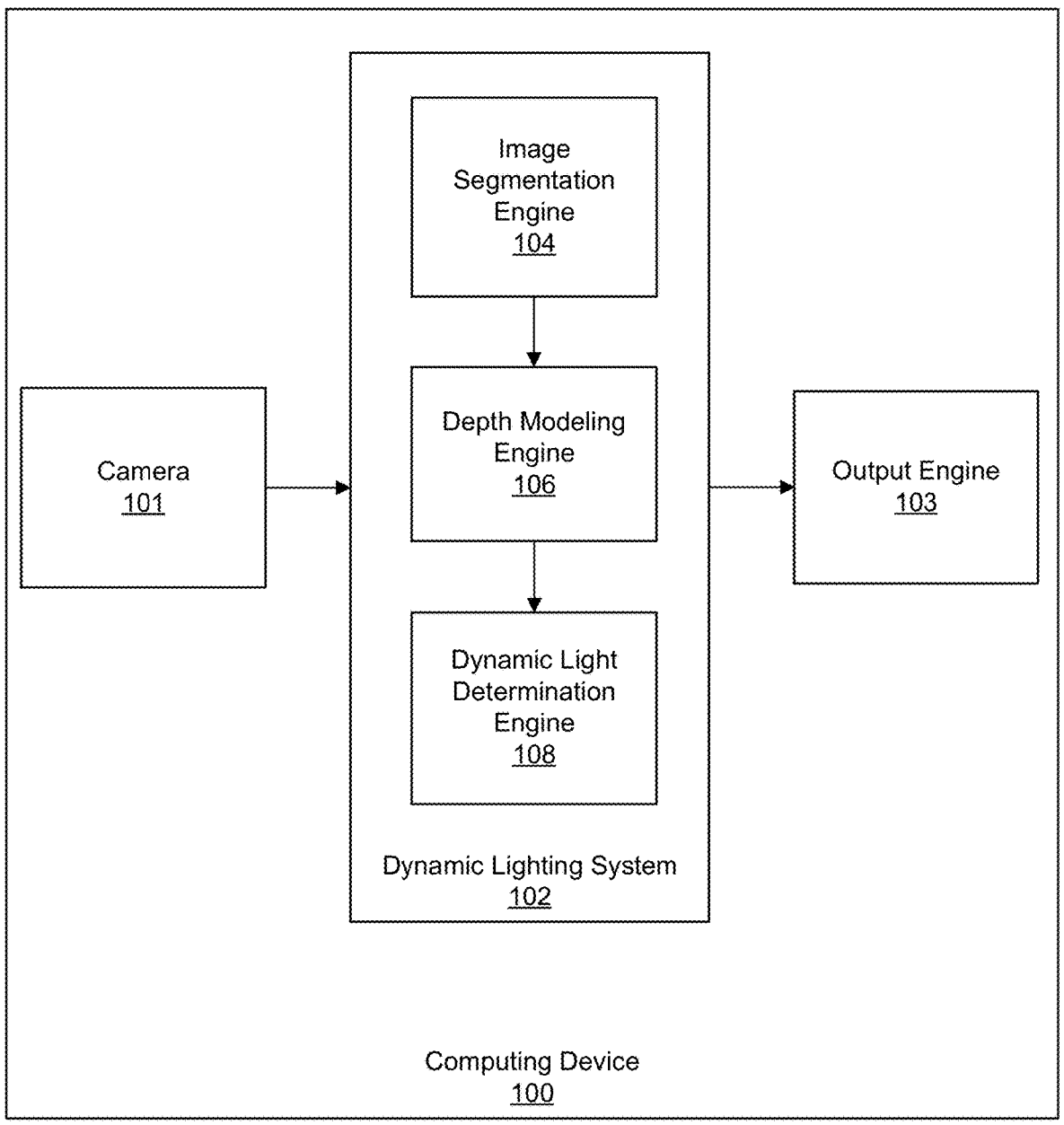
FIG. 1 is a block diagram illustrating an example of a computing device including a dynamic lighting system, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

In general, images of objects can be captured by devices, such as a camera or mobile device having one or more cameras. In such images, the lighting is frozen at the time of capture of the image, and as a result, shadows and highlights created by the existing lighting at the time of capture are frozen. In some cases, pre-existing lighting profiles can be used to artificially light an object in an image. However, in such cases, characteristics of the object are not taken into account to generate dynamic lighting for the object.

As described in more detail herein, methods, systems, and computer-readable media are described for determining dynamic lighting for objects in images. The techniques and systems can be implemented as a single-image and single-camera feature that allows a user to change lighting characteristics of light in a single image captured by a single camera. In one illustrative example, the single-image and single-camera feature can allow the user to change lighting characteristics of a portrait image where an object (e.g., the user's face, another person's face, or any other object) is depicted in the image in an emphasized manner as compared to the remaining portion (e.g., the background) of the image. The lighting characteristics can include the direction of the light (relative to the object in the image being illuminated, such as a face), the position of the light (relative to the object in the image being illuminated), the intensity of the light, a color or hue of the light, a diffuseness (or directionality) of the light, any combination thereof, and/or other suitable lighting characteristics.

Dynamic lighting can be determined for an object by performing a segmentation stage, a depth modeling stage, and a light stage. The segmentation stage can segment the foreground (corresponding to the object) from the remaining portion of the image (the background). In some examples, the segmentation stage can generate a segmentation mask with foreground corresponding to the object and background pixels. The depth modeling stage can obtain a three-dimensional model and can warp the model so that the model is customized to fit to the object. Depth values from a camera to the object can be determined for points of the three-dimensional model, and can be used to generate the customized (or object-specific) depth map. In some cases, the depth model can be selected for the object from a set of stored depth models. The warping can be performed using features extracted from the object. The depth modeling stage can be performed using a single camera (and thus without using multiple cameras) and without performing any active sensing using depth sensors. Once the depth model is fit to the object, the light stage can simulate the effects of a dynamic light shining on the object. For example, properties of the light shining on the object in the image can be controlled and modified. The controllable properties can include the intensity, position, and direction of the light.

FIG. 1 is a block diagram illustrating an example of a computing device 100 including a dynamic lighting system 102. The computing device 100 can include any suitable electronic device. For example, the computing device 100 can include a mobile or stationary telephone handset (e.g., smartphone, cellular telephone, or the like), a desktop computer, a laptop or notebook computer, a tablet computer, a wearable device (e.g., a smart watch, an activity tracker with a display, or the like), a set-top box, a television or other display device, a digital media player, a video gaming console, a video streaming device, or any other suitable electronic device. In some implementations, the dynamic lighting system 102 and the camera 101 can be part of separate computing devices.

The computing device 100 includes a camera 101 that can capture one or more images or videos, a dynamic lighting system 102 that can perform the techniques described herein, and an output engine 103 that can output the results from the dynamic lighting system 102. For instance, the results output by the output engine 103 can include an image with a dynamic lighting effect. While only certain components are shown as being part of the computing device 102, one of skill will appreciate that the computing device 102 can include additional components not shown in FIG. 1, such as memory (e.g., RAM, ROM, EEPROM, cache memory, one or more buffers, one or more databases, and/or other suitable memory devices), one or more processors (e.g., one or more CPUs, one or more graphics processors, and/or other suitable processing devices), one or more wireless transceivers for wirelessly communicating data, among other components.

The dynamic lighting system 102 can determine dynamic lighting for an object in an image using an image segmentation engine 104 that can perform a segmentation stage, a depth modeling engine 106 that can perform a depth modeling stage, and a dynamic light determination engine 108 that can perform a light stage. For example, the image segmentation engine 104 can perform the segmentation stage by segmenting the image into a foreground region (including the at least one object) and a background region (including other regions of the image not including the at least one object). For instance, the image segmentation engine 104 can generate a segmentation mask around an object of interest in the image. Any suitable image segmentation algorithm can be used to perform the image segmentation. Examples of image segmentation techniques include background subtraction-based segmentation, thresholding-based segmentation, clustering-based segmentation, compression-based segmentation, histogram-based segmentation, edge detection-based segmentation, region-growing-based segmentation, among others.

After segmenting the image, a three-dimensional (3D) model of the foreground in the image can be constructed by the depth modeling engine 106. Using a face as an example of an object, the depth modeling engine 106 can fit a 3D face model onto a user's face in the image and, in some cases, other parts of the user's body (e.g., an upper chest region of the user). Further details of the processes performed by the depth modeling engine 106 are described below with respect to FIG. 2.

An additional light source can then be added to the scene in the image by the dynamic light determination engine 108. For example, the effects of a dynamic light shining on the object (e.g., a person's face) can be simulated. A user is able to dynamically control lighting characteristics of one or more light sources for the image, such as the intensity of the light, the position of the light, the direction of the light, the color of the light, a diffuseness (or directionality) of the light, or any combination thereof. For instance, using an input interface of the computing device 102, a user is able to cause the computing device 100 to change the characteristics (e.g., direction, position, color, intensity, etc.) of the light using gestures or other input on the device. In one illustrative example, the user can perform an up gesture, down gesture, left gesture, and/or right gesture to move the position and/or direction of the light relative to the object in the image. The input interface can include a touchscreen, a physical and/or virtual keypad, an audio input (for audio commands), a visual input (for gesture-based commands), any combination thereof, and/or other suitable input interface. Further details of the processes performed by the light determination engine 108 are described below with respect to FIG. 5.

Figure 2:
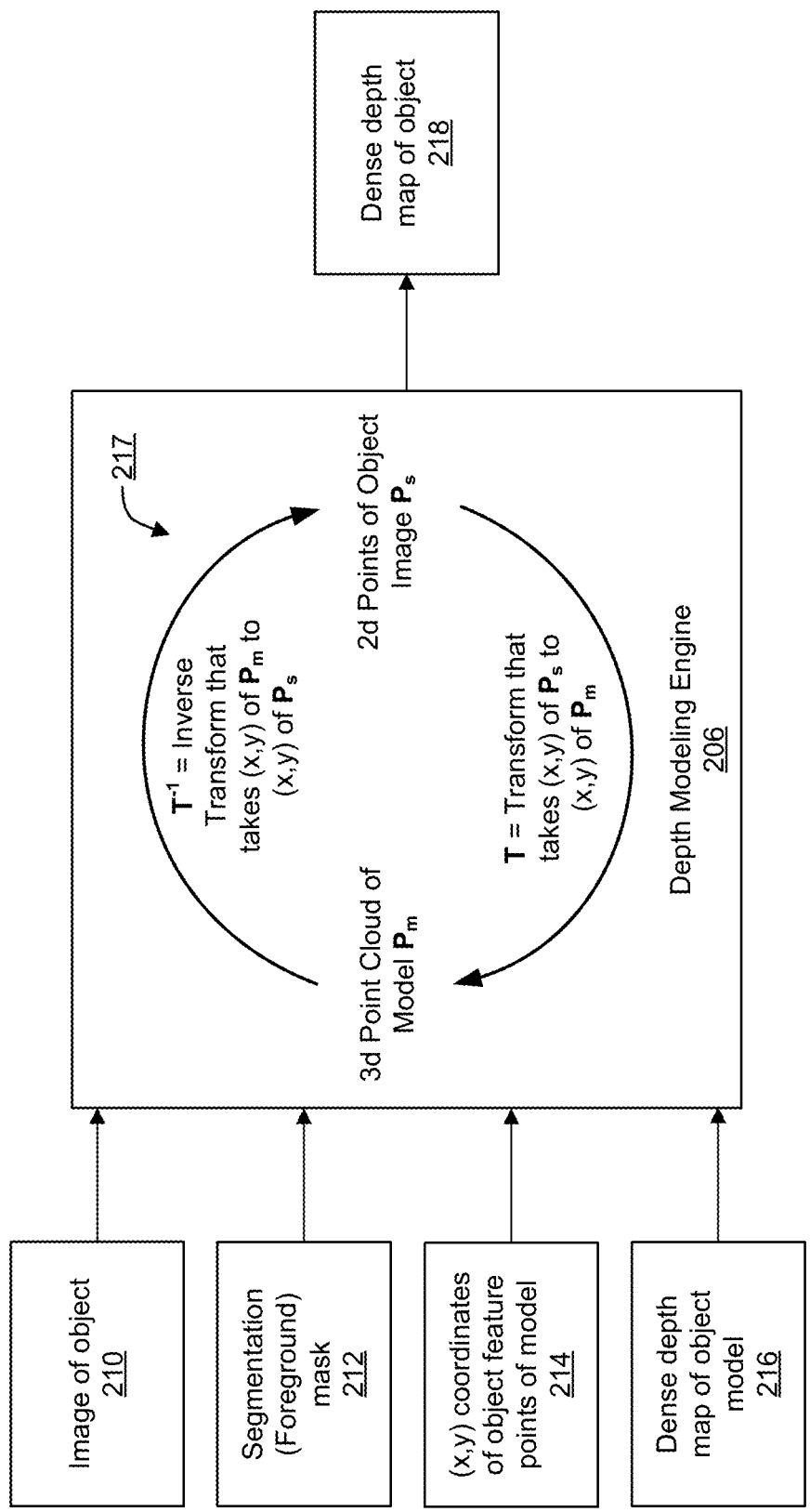
FIG. 2 is a diagram illustrating operation of a depth modeling engine, in accordance with some examples.

FIG. 2 is a diagram illustrating operation of the depth modeling engine 206. The inputs to the depth modeling engine 206 include an image 210 of an object of interest (referred to as an object image $P_s$), a segmentation mask 212 (also referred to as a foreground mask) generated by the image segmentation engine, the (x,y) coordinates 214 of object feature points of an object model, and a dense depth map 216 of the object model. The input image 210 can be captured by the camera 101 of the computing device 100, can be obtained from another device, and/or can be obtained from storage. The input image 210 is a two-dimensional image comprising an array of pixels. The pixels of the image 210 can include red-green-blue values, luma and chroma values (e.g., YUV, YCbCr, or the like), or other color components defining the color of each pixel in the image 210. The segmentation mask 212 can include foreground pixels for pixels corresponding to the object of interest (e.g., a person's face) and background pixels for the rest of the image 210 (e.g., pixels corresponding to areas in the image other than the person's face). In some examples, the segmentation mask 212 can include a binary image mask, with a first pixel value for foreground pixels and a second pixel value for background pixels. In one illustrative example, the first pixel value (for foreground pixels) can include a 1, and the second pixel value (for background pixels) can include a 0. In another illustrative example, the first pixel value can be a 0 and the second pixel value can be a 1. In some cases, a pixel value of 1 can correspond to a white color, in which case pixels assigned a value of 1 are white. In such cases, a pixel value of 0 can correspond to a black color, in which case pixels assigned a value of 0 are black.

Figure 3A:
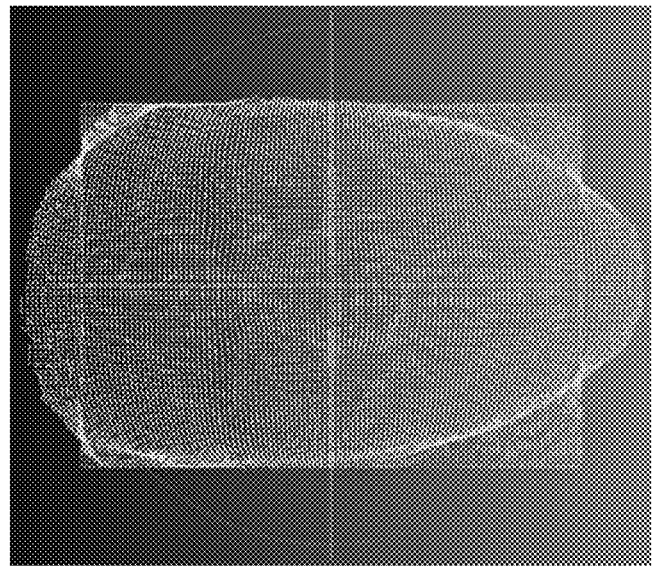
FIG. 3A-FIG. 3C are diagrams illustrating different views of a three-dimensional point cloud with no texture, in accordance with some examples.
Figure 3B:
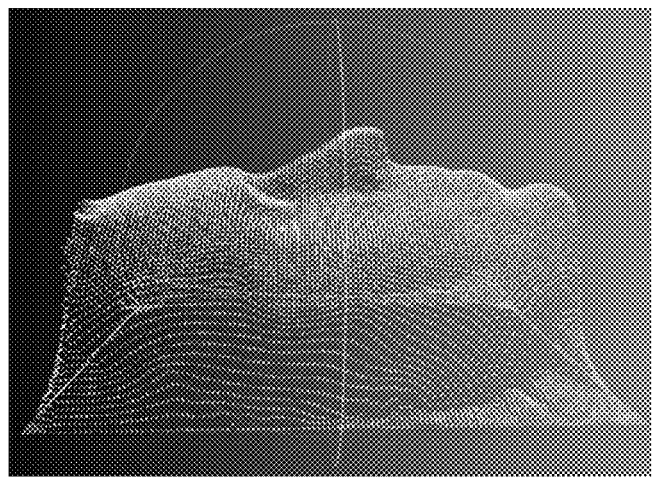
Figure 3C:
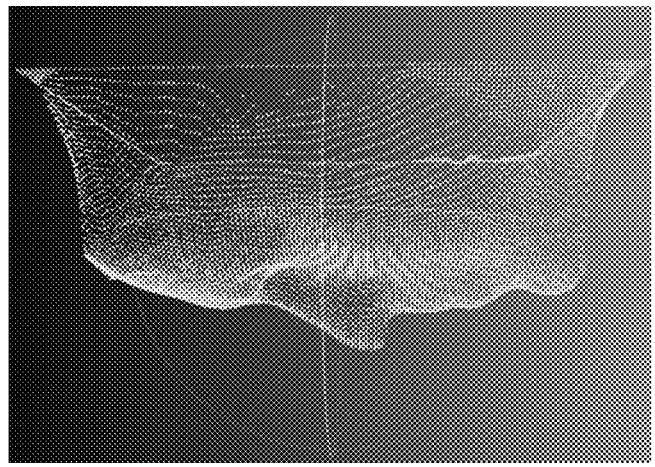

The object model (denoted as $P_m$) can include a generic model for a particular type of object. For example, one or more generic face models can be maintained for human faces. FIG. 3A, FIG. 3B, and FIG. 3C are diagrams illustrating different views of a 3D point cloud of a face model, where no texture is overlaid over the 3D point cloud. The diagrams in FIG. 3A, FIG. 3B, and FIG. 3C show the densified model 3D point cloud with a uniform grid in an (x,y) dimension via linear interpolation to approximately 16,000 points. FIG. 4A, FIG. 4B, FIG. 4C are diagrams illustrating different views of the 3D point cloud with texture overlaid over the 3D point cloud. The dense depth map 216 can include one or more stored depth models that include depth values for the points of the object model. For example, a lookup table may be stored that has a depth for each point of the 3D point cloud of the object model. Referring to FIG. 3A, FIG. 3B, and FIG. 3C, for example, a lookup table or other mechanism can store a respective depth value for each of the approximate 16,000 points shown in the figures.

The object feature points (associated with the (x,y) coordinates 214) can be landmark points on the object of interest, which can include points on the object that are uniquely identifiable. Using a face as an example of an object of interest, the object feature points can include facial feature points (or facial landmarks) on the face. The object feature points can be used to map between points of the generic object model and points in the portion of the two-dimensional image 210 corresponding to the object of interest (e.g., the foreground pixels corresponding to a person's face in the image 210). Any number of object feature points can be used. For example, using a face as an example of an object, facial feature points can include one or more points for the right eye (e.g., a center point in the center of the pupil for the right eye), one or more points for the left eye (e.g., a center point in the center of the pupil for the right eye), one or more points for the nose (e.g., a center point at the tip of the nose), one or more points for the mouth (e.g., a point at each corner of the mouth), one or more points along the cheek bones, among other possible facial feature points. In some examples, many feature points can be used, such as 50 or more feature points for a face or other object. The more object feature points that are used, the more accurate and specific the object-specific depth map and model will be to the object.

The input data is provided to the depth modeling engine 206, which generates a dense depth map 218 of the object of interest. The dense depth map 218 can also be referred to as an object-specific depth map. Using a face as an example, a dense depth map of a person's face can be generated. In some cases, the depth modeling engine 206 can also generate a 3D model that is fit to the object (referred to as an object-specific model). The points of the object-specific 3D model can be associated with the depth values in the depth map 218. Using a face as an example, a person-specific model of a person's face can be generated. The segmentation mask 212 can be used by the depth modeling engine 206 to separate the foreground region from the background region so that only the foreground pixels of the object are processed. For example, once the dynamic lighting system 102 has the foreground segmented from the background, the system 102 knows where the pixels of the object are.

As described above, object feature points can be extracted from the foreground pixels in the segmentation mask 212. A transform can be used to map the object feature points (e.g., object landmarks) of the object in the image 210 to the stored object model's object feature points. For example, the generic object model (denoted as $P_m$ in FIG. 2) can be customized to fit the object in the image 210. As described below with respect to the diagram 217 in FIG. 2, a transform can be determined that maps where a certain object feature point (e.g., an eye) is with respect to the same object feature point in the stored generic object model. The transform can then be applied to the object model to generate the object-specific model. Once the object model is warped using the transform, depth can be rendered for the points of the object-specific model. In some cases, pre-stored depth models can be used to render the depth. The dense depth map 216 is an example of a depth model. Depth values can be obtained from the stored 3D point cloud of the dense depth map 216, and can be used to generate the dense depth map 218 of the object. For instance, a lookup table can have a mapping between each point of the warped 3D point cloud and a corresponding depth value. By using stored depth models, the depth can be modeled for the object without using any structured light, and without using any active sensing or multiple cameras to compute depth maps.

As shown by the diagram 217 in FIG. 2, a transform is determined that maps (x,y) coordinates of object feature points of the object (the foreground pixels) in the object image 210 to matching (x,y) coordinates of object feature points in the generic object model point cloud. The transform can include any suitable transform that can interpolate between points. One illustrative example of a transform includes the Thin Plate Spline (TPS) transform. The TPS transform is described, for example, in Bookstein, "Principal Warps: Thin-Plate Splines and the Decomposition of Deformations," June 1989, which is hereby incorporated by reference in its entirety and for all purposes. Using the TPS transform as an example, the depth modeling engine 206 can estimate the Thin Plate Spline transform T that goes from the two-dimensional input from the object image $P_s$ to the customized three-dimensional space of the model $P_m$. For example, the Thin Plate Spline transform T can transform (x,y) coordinates of object features (e.g., facial features) in the object image $P_s$ to matching (x,y) coordinates in the point cloud of the model $P_m$. The transform T can then be applied to the two-dimensional object image 210 to warp the (x,y) coordinates of all points in the foreground of the object image 210 $P_s$ to the corresponding points in the object model $P_m$. Again using TPS as an example, the depth modeling engine 2016 can apply the TPS transform T to warp the (x,y) coordinates of all points in the foreground of object image (denoted as $T(P_s)$). The (x,y) coordinates of the points between the object feature points can then be interpolated using the TPS transform.

The depth values from the dense depth map 216 assigned to the dense point cloud of the object model can be assigned to the corresponding points of the object image 210. For example, using a lookup table (LUT), the depth values can be assigned to each (x,y) coordinate in the object image 210 $P_s$, which can be denoted as $P_s$=depth of $P_m$(round($T(P_s)$)), where $P_m$ is a densified uniform grid 3D point cloud of the object model or portion thereof (e.g., the face of the model). As shown by the diagram 217 in FIG. 2, an inverse of the transform T can be estimated and applied to transform back to the two-dimensional (image) domain. For example, the inverse transform can then be estimated for mapping the points of the model $P_m$ to the points on the object image 210 $P_s$. Using TPS as an example, the inverse of the TPS transform (denoted as $T^{-1}$) can be estimated and used to map the (x,y) coordinates of the points of the object model $P_m$ to matching (x,y) coordinates of the points of the object image 210 $P_s$.

Using the above-described techniques, the depth modeling engine 206 can obtain coordinates of object feature points of the object in the image. For example, facial features of a person's face can be extracted, and coordinates of the facial features can be determined. The depth modeling engine 206 can determine coordinates of corresponding points of the 3D model that correspond to the object feature points of the object. For example, if one of the object feature points is the tip of a person's nose, the coordinate of a point in the 3D model that corresponds to a nose tip is determined. Such a determination can be made for all object feature points in the model that have coordinates in the (x,y) coordinates 214 that are input to the depth modeling engine 206. The depth modeling engine 206 can then modify the coordinates of the corresponding points of the 3D model to match the coordinates of the object feature points of the object in the object image 210 in order to customize the 3D model to the object. The depth modeling engine 206 can also modify coordinates of remaining points of the 3D model to match coordinates of remaining points of the object in the image by interpolating between the object feature points. The depth values from the dense depth map 216 of the object model can then be assigned to the points of the object in the image.

As noted above, generation of the dense depth map 218 can be performed using a single image captured by a single camera, without the need for multiple cameras and/or depth sensors to be used for generating the depth values for the two-dimensional image 210. Generation of the dense depth map 218 can be used for many purposes, such as for determining dynamic lighting, as described below. The dense depth map 218 can also be used for any other suitable purpose other than determination of dynamic lighting.

The dense depth map of an object output from the depth modeling engine 206 can be used, along with the input image and the segmentation mask of the object, to determine dynamic lighting for the object. Properties of light can be used to determine the dynamic lighting. For example, the way light reflection is seen on objects in general depends on various factors, including the angle of incidence, the light flux, and the attenuation of the light flux. The angle of incidence is the angle that an incident ray cast from the source of the light (referred to as a light source) makes with a perpendicular to the surface at the point of incidence. The light flux is a relative measure of the perceived power of a light source. Attenuation represents the gradual loss of light flux as it travels through a medium. Attenuation is affected by the distance between the light source and an object.

The dynamic light determination engine 108 can generate and simulate dynamic light in two steps—a preprocessing step and a rendering step. The preprocessing step includes generating a normal map based on the depth map data from the depth map output from the depth modeling engine 206, and then adding in Ambient Occlusion to darken cavities in the object (e.g., cavities in a face, such as around the eyes). In some cases, the preprocessing step can also include computing noise factors and/or eroding the segmentation mask. The rendering step includes performing lighting calculations. In some cases, the rendering step can cull out the background if requested by a user. In some cases, a perspective transformation can then be performed to fit the final result to the screen or display.

Figure 5:
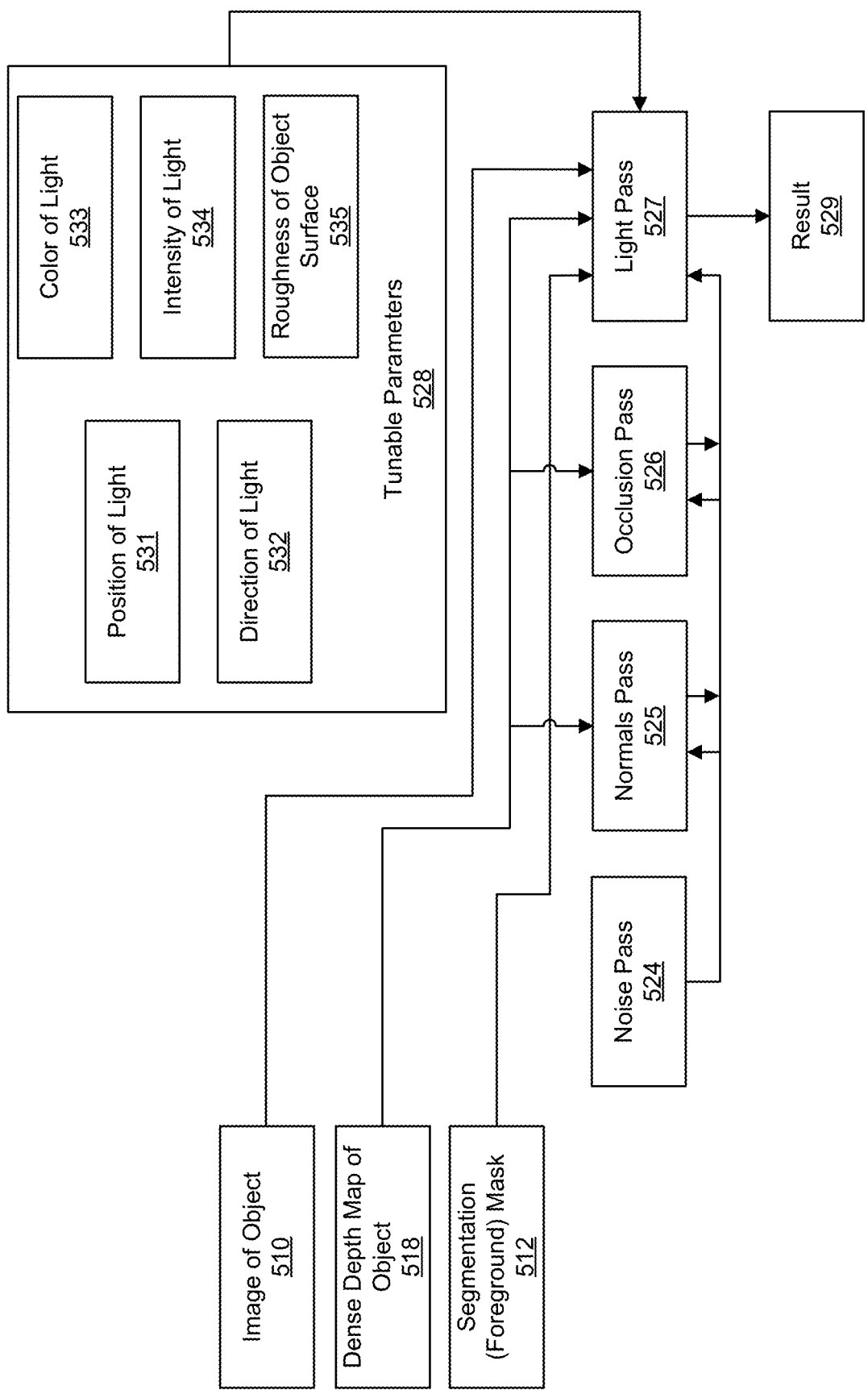
FIG. 5 is a diagram illustrating operation of a dynamic light determination engine, in accordance with some examples.
Figure 6C:
FIG. 6C is an example of an input color image, in accordance with some examples.
Figure 6B:
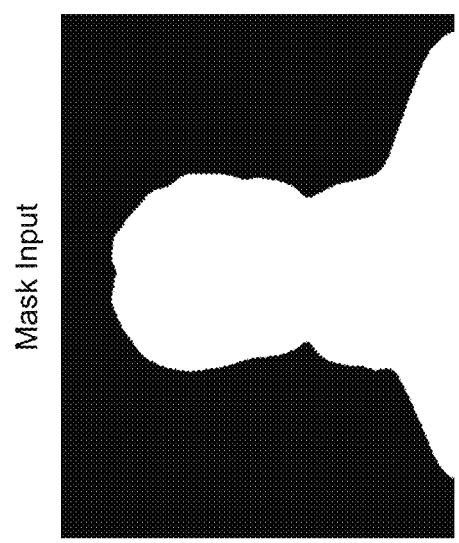
FIG. 6B is an example of a mask input image, in accordance with some examples.
Figure 6A:
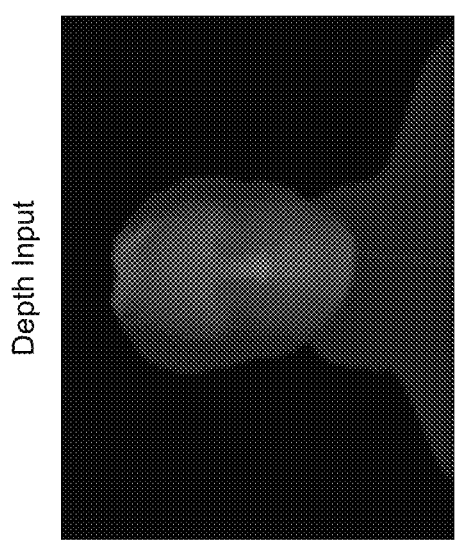
FIG. 6A is an example of a depth input image, in accordance with some examples.

FIG. 5 is a diagram illustrating operation of a dynamic light determination engine (e.g., the dynamic light determination engine 108). The inputs to the dynamic light determination engine include the image 510 of the object of interest, the dense depth map 518 generated by the depth modeling engine 506, and the segmentation mask 512 generated by the image segmentation engine. As noted above, the object can include a face of a person, a vehicle, or any other suitable object of interest. The dynamic light determination engine determines light values for each point of the object in the image 510. For example, a light value can be determined for each foreground pixel of the image 510 of the object. FIG. 6A is an image illustrating an example of the dense depth map 518 that provides depth input to the dynamic light determination engine. The dense depth map 518 can be provided from the depth modeling engine 206. FIG. 6B is an image illustrating an example of the segmentation mask 512 providing mask input to the dynamic light determination engine. FIG. 6C shows an example of the input object image 510. The input image 510 can be the same image as the input image 210, which was used to generate the dense depth map (e.g., dense depth map 518) shown in the image of FIG. 6A and the segmentation mask (e.g., segmentation mask 512) shown in the image of FIG. 6B.

Tunable parameters 528 are also used by the dynamic light determination engine to determine the light values. The tunable parameters 528 include lighting characteristics that can be dynamically adjusted by a user by means of an input interface. The lighting characteristics include a position 531 of a light source relative to the object of interest (e.g., relative to a person's face), a direction 532 of the light source relative to the object of interest, a color 533 (or hue) of the light from the light source, an intensity 534 of the light from the light source, and a roughness 535 of the object surface. The roughness 535 of the object surface determines the reflectance of the surface. For example, smoother surfaces tend to be more reflective than more textured surfaces. Different portions of the object can have different roughness, and thus different reflectances. For instance, the nose on a person's face can have different reflectance values than a check on the face.

Figure 7:
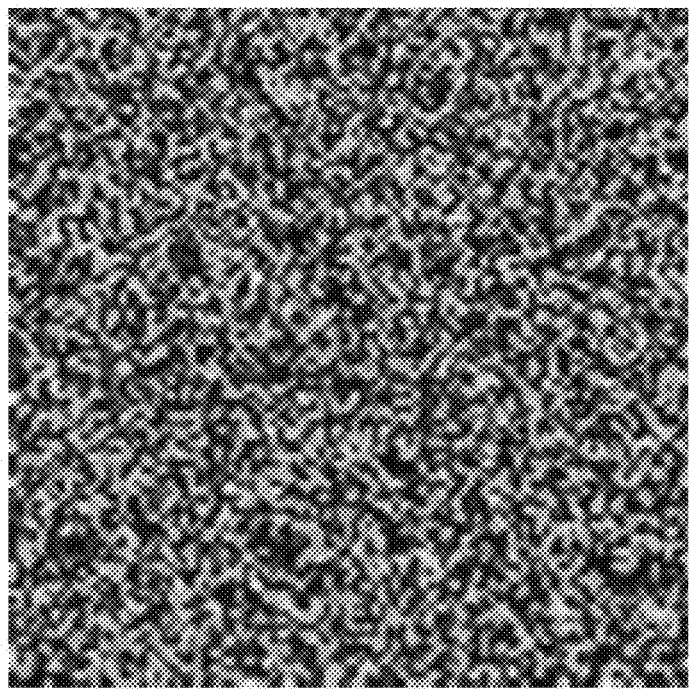
FIG. 7 is an image illustrating an example of a noise texture, in accordance with some examples.

The light determination engine can include a noise pass 524 that can be used to remove artifacts in the image that will be displayed by the computing device. For example, during the lighting stage, the light determination engine will perform sampling of neighboring pixels to determine a pixel value. For instance, for a given pixel, nearby pixels can be sampled to determine values that are neighborhood dependent. When the same pattern of neighboring pixels (e.g., the above, left, right, and bottom neighboring pixels of a given pixel) is repeatedly sampled determine a value for each pixel, artifacts can be formed in the resulting image. Random noise can be used to fight against aliasing artifacts when processing pixel values that depend on neighboring pixels. A channel noise texture can be generated by the noise pass 524, which can be referenced later by the dynamic light determination engine. One illustrative example of a channel noise texture is a 100×100 3-Channel noise texture that can be referenced later when processing. Any noise generation algorithm can be used to generate the random noise. One illustrative example includes a 2D Simplex Noise. FIG. 7 is an image (4× scaled) illustrating an example of a noise texture generated by the noise pass 524. The noise pass 524 is an optional feature. In some cases, the noise pass 524 can be left out of the light determination engine completely.

Figure 8A:
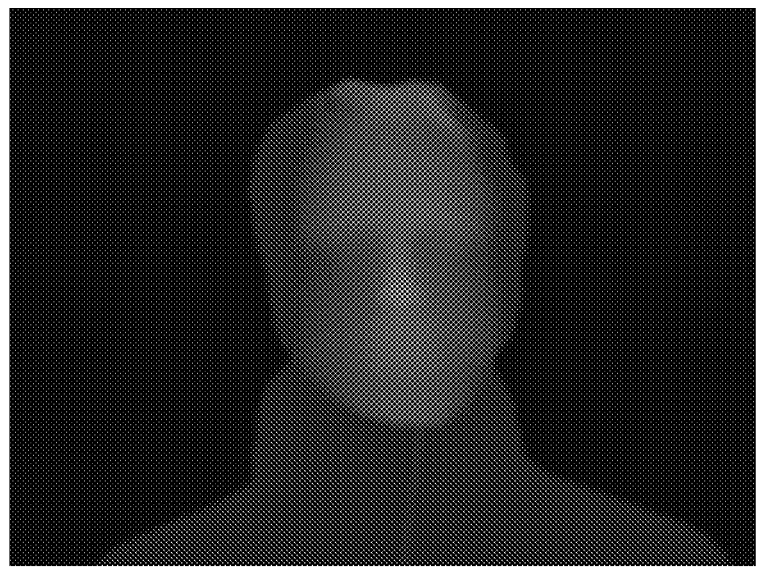
FIG. 8A is an example of a depth input image, in accordance with some examples.
Figure 8B:
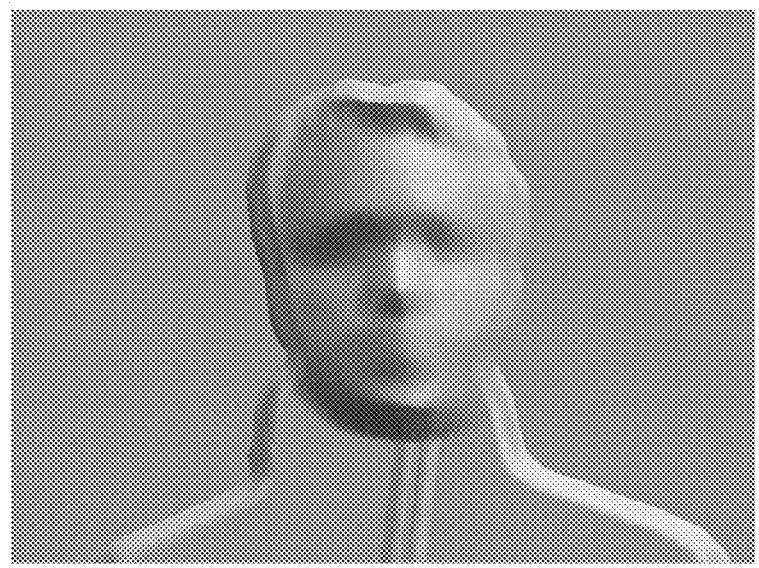
FIG. 8B is an image illustrating an example red-green-blue (RGB) values of a normal map, in accordance with some examples.

The light determination engine also includes a normals pass 525 that can be used to generate a normal map for the object in the input object image 510. A normal is a vector perpendicular to a surface at a specific point. A normal can be used in computer graphics for lighting calculations. For example, in Lambertian diffusion models, light observed at a point is directly proportional to the cosine of the angle θ between the direction of the incident light and the surface normal. The dense depth map 518 is used to produce the normal map. The texture can include x, y, z values, where the x and y values are the two-dimensional position of the pixel and the z value is the height from the dense depth map 518 output from the depth modeling engine 206. The normal pass 525 can analyze the dense depth map 518 to determine how the height is changing at a certain pixel in the neighborhood, such as on x-axis and on the y-axis, and then the cross product of that can provide the normal at that certain pixel. For example, the normals pass 525 can generate normals for the normal map by representing the depth as a function of position d(x,y), and taking the cross product of the two partial derivatives $d_x$ and $d_y$. A normal can be computed for each point on the dense depth map 518, with the normals of all points in the dense depth map 518 making up the normal map. FIG. 8A is an image illustrating the dense depth map 518, and FIG. 8B is an image illustrating the RGB values of the normal map generated by the normals pass 525. The normal map is used by the light pass 527 and can also be used by the occlusion pass 526.

Figure 9A:
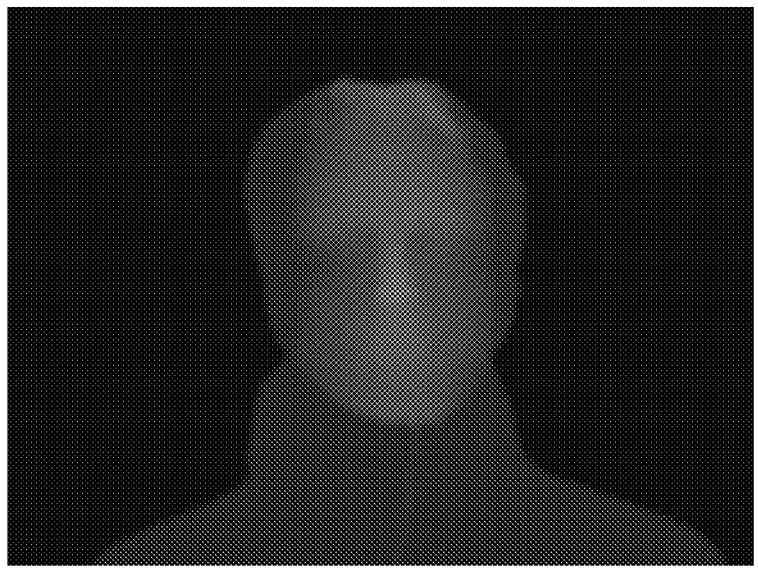
FIG. 9A is an example of a depth input image, in accordance with some examples.
Figure 9B:
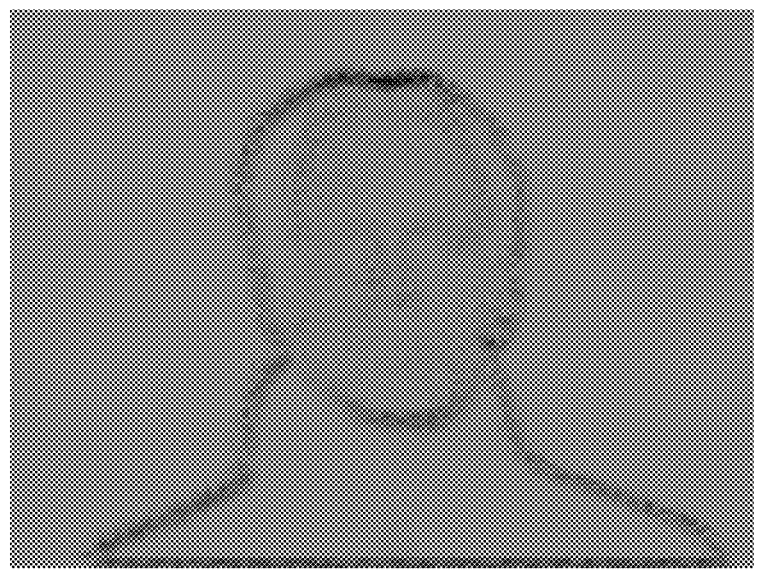
FIG. 9B is an example of an ambient occlusion (AO) map, in accordance with some examples.

The light determination engine also includes an occlusion pass 526 for determining ambient occlusion (AO) that is used to generate an AO map. A more realistic lighting simulation can be achieved by including ambient occlusion. Ambient occlusion calculates how exposed each point on the surface of the object is to lighting, which can be based on the depth or normal of each point. The more exposed a point is to a light source, the more luminance the point has. For instance, the eyes on a person's face are deeper than other portions of the face, and thus create a cavity on the face. Due to occlusion caused by the deep points on the eyes, less light will hit the eyes from a light source. The depth map data of the dense depth map 518 is used to calculate the AO map. The illumination at each point can be determined as a function of other geometry of the object. For example, for each visible point, the ambient occlusion can be determined as an integration of the projection of the surface normal at that point into the given direction over which integration is performed. FIG. 9A is an image illustrating the dense depth map 518, and FIG. 9B is an image illustrating the AO map generated by the occlusion pass 526.

The light pass 527 of the light determination engine can then use all the previously generated data and the tunable parameters 528 to simulate the effects of the light hitting the object at a particular position. For example, the light pass 527 can use the previously generated data from the noise pass 524 (when used or included in the light determination engine), the normals pass 525, and the occlusion pass 526, as well as the tunable parameters 528, to determine lighting values for each point of the object (e.g., each foreground pixel) in the image 510. As noted above, the tunable inputs (tunable parameters 528) to the light pass 527 step are the light source's position, direction, color, and intensity, and the roughness of the object surface. The segmentation mask 512 can be used to determine which pixels are foreground pixels, and thus which pixels correspond to the object of interest (e.g., a person's face or other object). The ambient light from the light source is attenuated by the AO map.

Using the normal map, a value for the normal is known at each point of the object (e.g., each foreground pixel) in the input image 510. Using a face as an example, the normal to the skin surface at the location of each point on the face is known from the normal map. Further, the reflectivity of different points on the object is known based on the roughness assigned to those points. In some cases, the roughness of each point of the object can be a pre-stored value that can be referenced to determine a reflectivity for that point. In some cases, the reflectivity itself can be stored for each point on an object (e.g., for a face). Thus, for a given point on the object in the image, the normal to the surface and the reflectivity properties of the surface are known (based on the known roughness of one or more portions of the object).

Further, the tunable parameters 528 are also provided to the light pass 527, which can include the direction 532 of the light relative to the object, the position 531 of the light relative to the object, the light intensity 534, the light color 533, and/or the roughness 535 of the object surface. Given these inputs for the given point on the object, the light pass 527 can compute the lighting value for which that point needs to have in terms of illumination. The pixel for the given point on the object can be modified to take into account the determined lighting value. For instance, the luma component of the pixel can be modified to make the pixel brighter or dimmer according to the determined lighting value. In one illustrative example, the pixel can be converted to linear light space, and different aspects of illumination can be determined, including ambient light, diffuse light, and specular light. The ambient, diffuse, and specular light can then be added to obtain a value between zero and one, with a zero value being dim and a one value being completely illuminated. In such an example, the pixel from the original image can be multiplied by the illumination (the value between zero and one) determined for that pixel. The pixel can then be converted back from the linear light space.

Figure 10A:
FIG. 10A is an image illustrating an example of a light simulation using dynamic lighting, in accordance with some examples.
Figure 10B:
FIG. 10B is an image illustrating another example of a light simulation using dynamic lighting, in accordance with some examples.

In one illustrative example, the lighting values for the points of the object in the image can be determined using a Lambertian diffuse model and a Cook-Torrance microfacet specular shading model. Further, the GGX/Trowbridge-Reitz distribution function with alpha parameterized can be used as roughness. For the geometry term, the Schlick model can be used. The light pass 527 can then generate a result 529 that includes an image with the determined light values. FIG. 10A is an image illustrating an example of a light simulation result produced by the light pass 527 based on certain tunable parameter values. As can be seen in FIG. 10A, the light source is coming from a direction directly in front of the person in the image. FIG. 10B is an image illustrating another example of a light simulation result produced by the light pass 527 based on other tunable parameter values. As can be seen in FIG. 10B, the light source is coming from a direction to the left of the person in the image (from the person's perspective).

Figure 11:
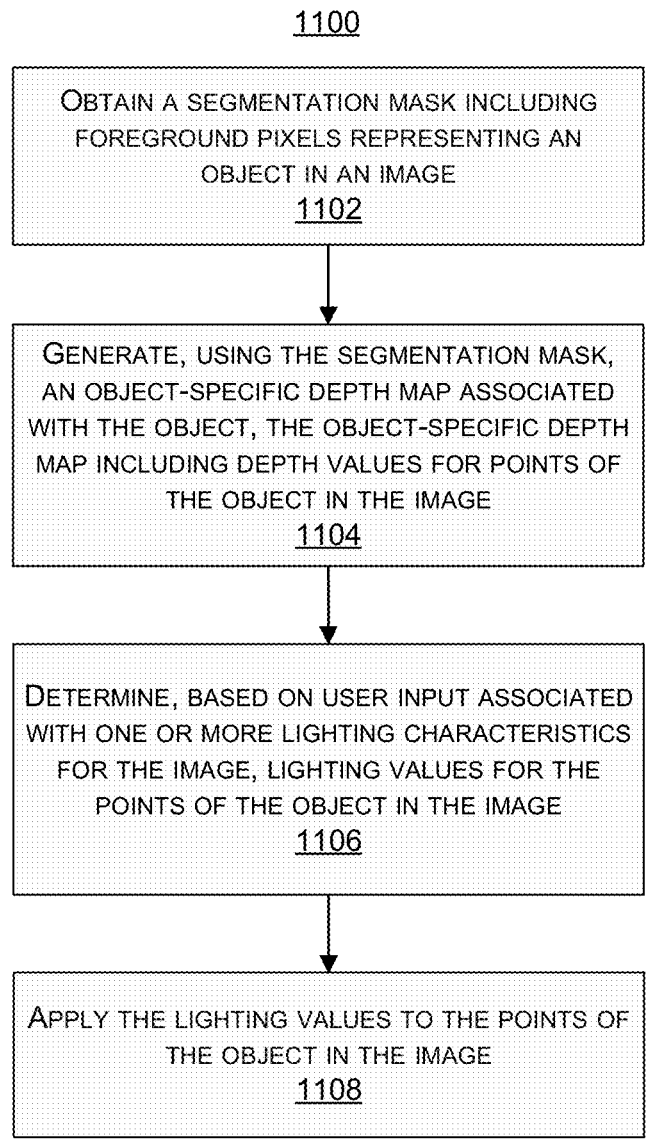
FIG. 11 is a flowchart illustrating an example of a process of generating dynamic lighting for one or more objects in one or more images, in accordance with some examples.

FIG. 11 is a flowchart illustrating an example of a process 1100 of adjusting a lighting condition in one or more captured images using the techniques described above. At block 1102, the process 1100 includes obtaining a segmentation mask including foreground pixels representing an object in an image. In one illustrative example, the object can include a face of a person. For instance, the image can include a portrait image that includes the person's face. The segmentation mask can be used to determine foreground pixels in the image that correspond to the object.

At block 1104, the process 1100 includes generating, using the segmentation mask, an object-specific depth map associated with the object. The object-specific depth map includes depth values for points of the object in the image. For example, a depth value can be determined for each point of the object in the image (e.g., for each foreground pixel corresponding to the object). Generating the object-specific depth map can include using the segmentation mask to determine which pixels from the image include the foreground pixels of the object. In some examples, the object-specific depth map and an object-specific model are generated by fitting points of a three-dimensional model to points of the object in the image. The object-specific depth map can be associated with the object-specific model (e.g., using a lookup table or other mechanism). The three-dimensional model can include a generic model for a particular object (e.g., a generic person face model) that can be modified to generate an object-specific model that is tailored to a particular object (e.g., a particular person's face).

In one illustrative example, the object-specific depth map can be generated by obtaining coordinates of object feature points of the object in the image, and determining coordinates of corresponding points of the three-dimensional model that correspond to the object feature points of the object. In some examples, the object includes a face of a person. In such examples, the object feature points of the object in the image include facial landmarks on the face. Further, the coordinates of the corresponding points of the three-dimensional model can be modified to match the coordinates of the object feature points of the object. The coordinates of remaining points of the three-dimensional model can then be modified to match coordinates of remaining points of the object in the image by interpolating between the object feature points. In one example, a thin plate spline (TPS) transform can be used for modifying the coordinates of the points and for the interpolation. The object-specific depth map can then be generated by assigning depth values to the points of the object in the image. The depth values can be obtained from a dense depth map known for the three-dimensional model. The depth values from the dense depth map can be assigned to the points in the image.

At block 1106, the process 1100 includes determining, based on user input associated with one or more lighting characteristics for the image, lighting values for the points of the object in the image. In some examples, the one or more lighting characteristics include one or more of an intensity of a light source, a color of light from the light source, a direction of the light source relative to the object in the image, a position of the light source relative to the object in the image, a diffuseness of the light source, a roughness of a surface of the object, or any combination thereof. The lighting values for the points of the object in the image can be determined by determining a normal map using the object-specific depth map. As noted above, the normal map includes vectors perpendicular to a surface of the object. Based on the user input, one or more characteristics of a light source can be determined. The one or more characteristics of the light source include the intensity of the light source, the color of light from the light source, the direction of the light source relative to the object in the image, the position of the light source relative to the object in the image, the diffuseness of the light source, or any combination thereof. A reflectivity of each point of the object in the image can be determined based on a roughness of the object. In some cases, the reflectivity of each point on the object can be known based on stored reflectivity values. The lighting values for the points of the object in the image can then be determined based on the normal map, the one or more characteristics of the light source, and the reflectivity of each point of the object, as described above.

At block 1108, the process 1100 includes applying the lighting values to the points of the object in the image. For example, the value of each luma component of each pixel corresponding to the object in the image (e.g., each foreground pixel) can be modified to include the lighting value determined for each pixel.

In some examples, the process 1100 includes receiving the image of the object, and generating the segmentation mask by segmenting the image into the foreground pixels of the object and background pixels.

In some examples, the process 1100 includes selecting the three-dimensional model from a plurality of models based on the object in the image. In some cases, the plurality of models are stored locally on a computing device (e.g., the computing device that performs the process 1100). In some cases, the plurality of models are stored remotely on one or more servers that are remote from the computing device that performs the process 1100.

As noted above, the process 1100 can generate an object-specific model for the object by fitting points of a three-dimensional model to points of the object in the image. The process 1100 can also include storing the object-specific model. In some cases, the process 1100 can include receiving an additional image of the object, obtaining the object-specific model of the object, and determining lighting values for points of the object in the additional image using the object specific model. In such cases, the object-specific model can become more and more accurate over time as more images of the object are processed.

In some cases, the image of the object is captured using a single camera. In some examples, the depth values are determined without using an additional camera other than the single camera and without using an additional image other than the image of the object. In some cases, the depth values are determined without using any depth sensor. In some examples, the lighting values are determined without using pre-determined lighting values (e.g., lighting profiles or the like) determined prior to receiving the image.

In some examples, the user input can be provided to a graphical user interface, and the graphical user interface can provide the user input to the computing device 100. For example, the process 1100 can include receiving, from a graphical user interface, the user input associated with the one or more lighting characteristics for the image, and displaying the image of the object with the applied lighting values. The user input can be received using any suitable type of graphical element of the graphical interface. For instance, the user input can be received in response to an adjustment of a slider graphical element of the graphical interface. In another example, the user input can be received in response to selection of an icon graphical element of the graphical interface. In another example, the user input can be received in response to entry of text in a text entry graphical element of the graphical interface. In another example, the user input can be received in response to an audio command from the user. In another example, the user input can be received in response to a gesture command from the user.

In some cases, a user can adjust the one or more lighting characteristics using an input interface. For instance, the process 1100 can include receiving additional user input requesting a change in lighting, determining, based on the additional user input, updated lighting values for the points of the object in the image, applying the updated lighting values to the points of the object in the image.

Figure 12:
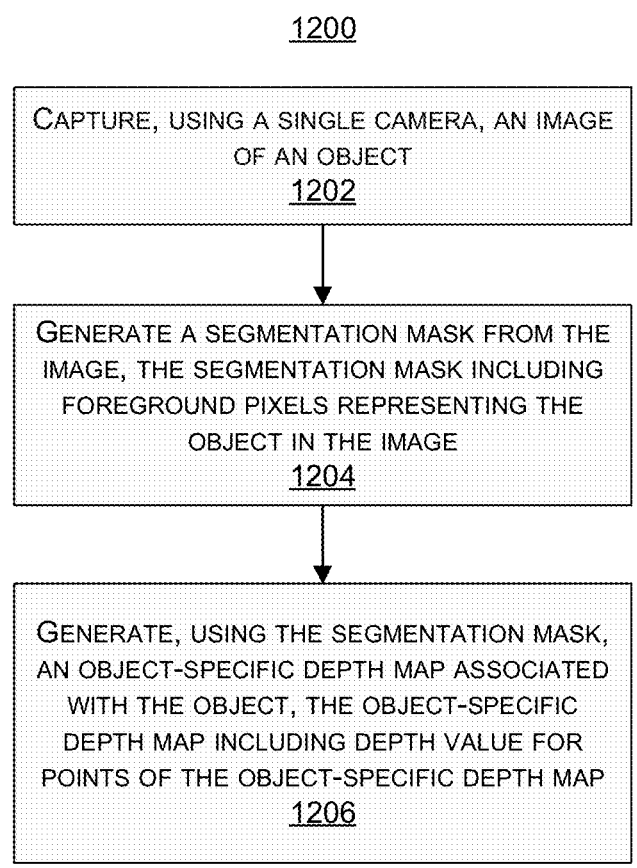
FIG. 12 is a flowchart illustrating an example of a process of generating one or more object-specific depth maps for one or more objects in one or more images, in accordance with some examples.

FIG. 12 is a flowchart illustrating an example of a process 1200 of generating one or more object-specific depth maps for one or more objects in one or more images using the techniques described above. At block 1202, the process 1200 includes capturing, using a single camera, an image of an object. In one illustrative example, the object can include a face of a person. For instance, the image can include a portrait image that includes the person's face.

At block 1204, the process 1200 includes generating a segmentation mask from the image, the segmentation mask including foreground pixels representing the object in the image. The segmentation mask is used to determine foreground pixels in the image that correspond to the object. As noted above, the segmentation mask can be generated by segmenting the image into the foreground pixels of the object and background pixels.

At block 1206, the process 1200 includes generating, using the segmentation mask, an object-specific depth map associated with the object, the object-specific depth map including a depth value for each point of the object-specific depth map. In some examples, the object-specific depth map and an object-specific model are generated by fitting points of a three-dimensional model to points of the object in the image. The object-specific depth map can be associated with the object-specific model (e.g., using a lookup table or other mechanism). The three-dimensional model can include a generic model for a particular object (e.g., a generic person face model) that can be modified to generate an object-specific model that is tailored to a particular object (e.g., a particular person's face).

In one illustrative example, the object-specific depth map can be generated by obtaining coordinates of object feature points of the object in the image, and determining coordinates of corresponding points of the three-dimensional model that correspond to the object feature points of the object. In some examples, the object includes a face of a person. In such examples, the object feature points of the object in the image include facial landmarks on the face. Further, the coordinates of the corresponding points of the three-dimensional model can be modified to match the coordinates of the object feature points of the object. The coordinates of remaining points of the three-dimensional model can then be modified to match coordinates of remaining points of the object in the image by interpolating between the object feature points. In one example, a thin plate spline (TPS) transform can be used for modifying the coordinates of the points and for the interpolation. The object-specific depth map can then be generated by assigning depth values to the points of the object in the image. The depth values can be obtained from a dense depth map known for the three-dimensional model. The depth values from the dense depth map can be assigned to the points in the image.

In some cases, the depth values are determined without using an additional camera other than the single camera and without using an additional image other than the image of the object. In some cases, the depth values are determined without using any depth sensor. In some examples, the lighting values are determined without using pre-determined lighting values (e.g., lighting profiles or the like) determined prior to receiving the image.

In some implementations, the process 1200 includes determining, based on user input associated with one or more lighting characteristics for the image, lighting values for points of the object in the image. The process 1200 can then apply the lighting values to each point of the object in the image. The one or more lighting characteristics can include one or more of an intensity of a light source, a color of light from the light source, a direction of the light source relative to the object in the image, a position of the light source relative to the object in the image, a diffuseness of the light source, a roughness of a surface of the object, or any combination thereof. The lighting values for the points of the object in the image can be determined by determining a normal map using the object-specific depth map. As noted above, the normal map includes vectors perpendicular to a surface of the object. Based on the user input, one or more characteristics of a light source can be determined. The one or more characteristics of the light source include the intensity of the light source, the color of light from the light source, the direction of the light source relative to the object in the image, the position of the light source relative to the object in the image, the diffuseness of the light source, or any combination thereof. A reflectivity of each point of the object in the image can be determined based on a roughness of the object. In some cases, the reflectivity of each point on the object can be known based on stored reflectivity values. The lighting values for the points of the object in the image can then be determined based on the normal map, the one or more characteristics of the light source, and the reflectivity of each point of the object, as described above.

Figure 13:
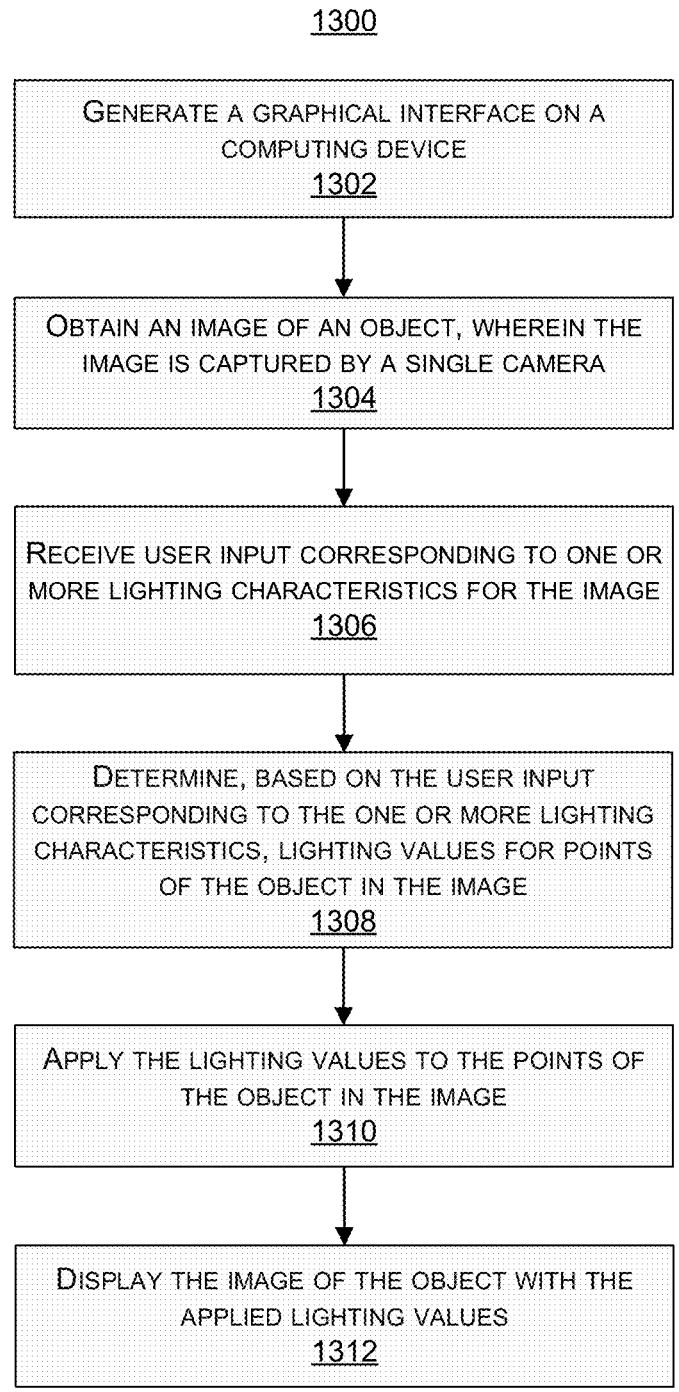
FIG. 13 is a flowchart illustrating an example of a process of generating a graphical interface for adjusting dynamic lighting for one or more objects in one or more images, in accordance with some examples.

FIG. 13 is a flowchart illustrating an example of a process 1300 of generating a graphical interface for adjusting dynamic lighting for one or more objects in one or more images using the techniques described above. At block 1302, the process 1300 includes generating a graphical interface on a computing device. At block 1304, the process 1300 includes obtaining an image of an object. The image is captured by a single camera. In one illustrative example, the object can include a face of a person. For instance, the image can include a portrait image that includes the person's face.

At block 1306, the process 1300 includes receiving user input corresponding to one or more lighting characteristics for the image. The one or more lighting characteristics can include one or more of an intensity of a light source, a color of light from the light source, a direction of the light source relative to the object in the image, a position of the light source relative to the object in the image, a diffuseness of the light source, a roughness of a surface of the object, or any combination thereof.

At block 1308, the process 1300 includes determining, based on the user input corresponding to the one or more lighting characteristics, lighting values for points of the object in the image. In one illustrative example, the lighting values for the points of the object in the image can be determined by determining a normal map using the object-specific depth map. As noted above, the normal map includes vectors perpendicular to a surface of the object. Based on the user input, one or more characteristics of a light source can be determined. The one or more characteristics of the light source include the intensity of the light source, the color of light from the light source, the direction of the light source relative to the object in the image, the position of the light source relative to the object in the image, the diffuse-ness of the light source, or any combination thereof. A reflectivity of each point of the object in the image can be determined based on a roughness of the object. In some cases, the reflectivity of each point on the object can be known based on stored reflectivity values. The lighting values for the points of the object in the image can then be determined based on the normal map, the one or more characteristics of the light source, and the reflectivity of each point of the object, as described above.

At block 1310, the process 1300 includes applying the lighting values to each point of the object in the image. At block 1312, the process 1300 includes displaying the image of the object with the applied lighting values.

In some examples, the process 1300 further includes receiving additional user input requesting a change in at least one of the one or more lighting characteristics. The additional user input can be based on any type of input via the graphical interface (e.g., an input interface of the graphical interface). For example, the additional user input can be received in response to an adjustment of a slider graphical element of the graphical interface. As another example, the additional user input can be received in response to selection of an icon graphical element of the graphical interface. As another example, the additional user input can be received in response to entry of text in a text entry graphical element of the graphical interface. As another example, the additional user input can be received in response to an audio command from the user. As another example, the additional user input can be received in response to a gesture command from the user. Any other suitable input can also be received requesting a change in the a lighting characteristic.

The process 1300 can determine, based on the additional user input, updated lighting values for the points of the object in the image. The process 1300 can then apply the updated lighting values to each point of the object in the image. The change in the at least one of the one or more lighting characteristics requested by the additional user input includes one or more of a change in intensity of a light source, a change in a color of light from the light source, a change in a direction of the light source relative to the object in the image, a change in position of the light source relative to the object in the image, a change in a diffuseness of the light source, or any combination thereof.

In some examples, the processes 1100, 1200, and 1300 may be performed by a computing device or an apparatus. In one illustrative example, the processes 1100, 1200, and 1300 can be performed by the computing device shown in FIG. 1. In some cases, the computing device or apparatus may include a processor, microprocessor, microcomputer, or other component of a device that is configured to carry out the steps of processes 1100, 1200, and 1300. In some examples, the computing device or apparatus may include a camera configured to capture one or more images or videos. For example, the computing device may include a camera device. As another example, the computing device may include a mobile device with a camera (e.g., a mobile phone or tablet including a camera, a camera device such as a digital camera, or other type of device with a camera). In some cases, the computing device may include a display for displaying images having the determined depth data and/or lighting values. In some examples, a camera or other capture device that captures the video data is separate from the computing device, in which case the computing device receives the captured video data. The computing device may further include a network interface configured to communicate the video data. The network interface may be configured to communicate Internet Protocol (IP) based data.

Processes 1100, 1200, and 1300 are illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 1100, 1200, and 1300 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The object detection and recognition techniques discussed herein may be implemented using compressed video or using uncompressed video frames (before or after compression). An example video encoding and decoding system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted, the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

As noted above, one of ordinary skill will appreciate that the less than ("<") and greater than (">") symbols or terminology used herein can be replaced with less than or equal to ("≤") and greater than or equal to ("≥") symbols, respectively, without departing from the scope of this description.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method for adjusting a lighting condition in one or more captured images, the method comprising:
   detecting feature points of an object in an image;

generating an object-specific model including mapped points, the mapped points being determined by fitting points of a three-dimensional model to the feature points of the object detected in the image;
determining depth values for the mapped points of the object-specific model;
generating an object-specific depth map associated with the object, the object-specific depth map including the depth values determined for the mapped points of the object-specific model;
determining, using the object-specific depth map and based on user input associated with one or more lighting characteristics for the image, lighting values for points of the object in the image; and
applying the lighting values to the points of the object in the image.

2. The method of claim 1, further comprising:
obtaining a segmentation mask including foreground pixels representing the object in the image; and
determining, using the segmentation mask, a region of the image including the object.

3. The method of claim 1, further comprising:
obtaining coordinates of the feature points of the object in the image;
determining coordinates of corresponding points of the three-dimensional model that correspond to the feature points of the object;
determining the mapped points of the object-specific model by modifying the coordinates of the corresponding points of the three-dimensional model to match the coordinates of the feature points of the object; and
modifying coordinates of remaining points of the three-dimensional model to match coordinates of remaining points of the object in the image by interpolating between the feature points.

4. The method of claim 1, further comprising selecting the three-dimensional model from a plurality of models based on the object in the image.

5. The method of claim 4, wherein the plurality of models are stored locally on a computing device.

6. The method of claim 4, wherein the plurality of models are stored remotely on one or more servers.

7. The method of claim 1, further comprising:
receiving the image of the object; and
generating a segmentation mask by segmenting the image into foreground pixels of the object and background pixels.

8. The method of claim 1, further comprising:
storing the object-specific model.

9. The method of claim 8, further comprising:
receiving an additional image of the object;
obtaining the object-specific model of the object; and
determining lighting values for points of the object in the additional image using the object-specific model.

10. The method of claim 1, wherein generating the object-specific depth map includes using a segmentation mask to determine which pixels from the image include foreground pixels of the object.

11. The method of claim 1, wherein the one or more lighting characteristics include one or more of an intensity of a light source, a color of light from the light source, a direction of the light source relative to the object in the image, a position of the light source relative to the object in the image, a diffuseness of the light source, and a roughness of a surface of the object.

12. The method of claim 1, wherein determining the lighting values for the points of the object in the image includes:
determining a normal map using the object-specific depth map, the normal map including vectors perpendicular to a surface of the object;
determining, based on the user input, one or more characteristics of a light source, the one or more characteristics of the light source including one or more of an intensity of the light source, a color of light from the light source, a direction of the light source relative to the object in the image, a position of the light source relative to the object in the image, and a diffuseness of the light source;
determining a reflectivity of each point of the object in the image based on a roughness of the object; and
determining the lighting values for the points of the object in the image based on the normal map, the one or more characteristics of the light source, and the reflectivity of each point of the object.

13. The method of claim 1, wherein the object includes a face of a person.

14. The method of claim 13, wherein the feature points of the object in the image include facial landmarks on the face.

15. The method of claim 1, wherein the image of the object is captured using a single camera, and wherein the depth values are determined without using an additional camera other than the single camera, without using an additional image other than the image of the object, and without using any depth sensor.

16. The method of claim 1, further comprising:
receiving, from a graphical user interface, the user input associated with the one or more lighting characteristics for the image; and
displaying the image of the object with the applied lighting values.

17. The method of claim 16, wherein the user input is received in response to an adjustment of a slider graphical element of the graphical user interface, in response to selection of an icon graphical element of the graphical user interface, in response to entry of text in a text entry graphical element of the graphical user interface, in response to an audio command from the user, or in response to a gesture command from the user.

18. The method of claim 1, further comprising:
receiving additional user input requesting a change in lighting;
determining, based on the additional user input, updated lighting values for the points of the object in the image; and
applying the updated lighting values to the points of the object in the image.

19. The method of claim 1, wherein the lighting values are determined without using pre-determined lighting values determined prior to receiving the image.

20. An apparatus for adjusting a lighting condition in one or more captured images, comprising:
a memory configured to store one or more images; and
one or more processors configured to:
detect feature points of an object in an image;
generate an object-specific model including mapped points, the mapped points being determined by fitting points of a three-dimensional model to the feature points of the object detected in the image;
determine depth values for the mapped points of the object-specific model;

generate an object-specific depth map associated with the object, the object-specific depth map including the depth values determined for the mapped points of the object-specific model;

determine, using the object-specific depth map and based on user input associated with one or more lighting characteristics for the image, lighting values for points of the object in the image; and apply the lighting values to the points of the object in the image.

21. The apparatus of claim 20, wherein the one or more processors are configured to:

obtain a segmentation mask including foreground pixels representing the object in the image; and determine, using the segmentation mask, a region of the image including the object.

22. The apparatus of claim 20, wherein the one or more processors are configured to:

obtain coordinates of the feature points of the object in the image;

determine coordinates of corresponding points of the three-dimensional model that correspond to the feature points of the object;

determining the mapped points of the object-specific model by modifying the coordinates of the corresponding points of the three-dimensional model to match the coordinates of the feature points of the object; and modify coordinates of remaining points of the three-dimensional model to match coordinates of remaining points of the object in the image by interpolating between the feature points.

23. The apparatus of claim 20, further comprising selecting the three-dimensional model from a plurality of models based on the object in the image.

24. The apparatus of claim 20, wherein the one or more processors are further configured to:

receive an additional image of the object;

obtain the object-specific model of the object; and determine lighting values for points of the object in the additional image using the object-specific model.

25. The apparatus of claim 20, wherein the one or more lighting characteristics include one or more of an intensity of a light source, a color of light from the light source, a direction of the light source relative to the object in the image, a position of the light source relative to the object in the image, a diffuseness of the light source, and a roughness of a surface of the object.

26. The apparatus of claim 20, wherein determining the lighting values for the points of the object in the image includes:

determining a normal map using the object-specific depth map, the normal map including vectors perpendicular to a surface of the object;

determining, based on the user input, one or more characteristics of a light source, the one or more characteristics of the light source including one or more of an intensity of the light source, a color of light from the light source, a direction of the light source relative to the object in the image, a position of the light source relative to the object in the image, and a diffuseness of the light source;

determining a reflectivity of each point of the object in the image based on a roughness of the object; and determining the lighting values for the points of the object in the image based on the normal map, the one or more characteristics of the light source, and the reflectivity of each point of the object.

27. The apparatus of claim 20, wherein the image of the object is captured using a single camera, and wherein the depth values are determined without using an additional camera other than the single camera, without using an additional image other than the image of the object, and without using any depth sensor.

28. The apparatus of claim 20, wherein the one or more processors are further configured to:

receive, from a graphical user interface, the user input associated with the one or more lighting characteristics for the image; and display the image of the object with the applied lighting values.

29. The apparatus of claim 20, wherein the apparatus comprises a mobile device.

30. The apparatus of claim 29, further comprising one or more of:

a camera for capturing the one or more images; and a display for displaying the one or more images with determined lighting values.

* * * * *